Nov. 5, 1929.　　　G. W. SUTTON　　　1,734,057
PINTLE RETAINER
Filed Aug. 20, 1927
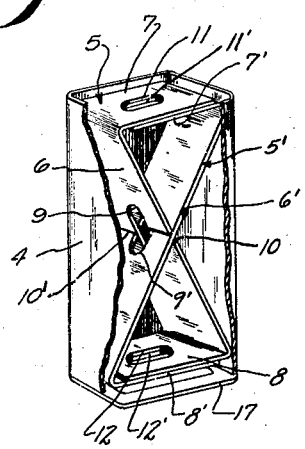
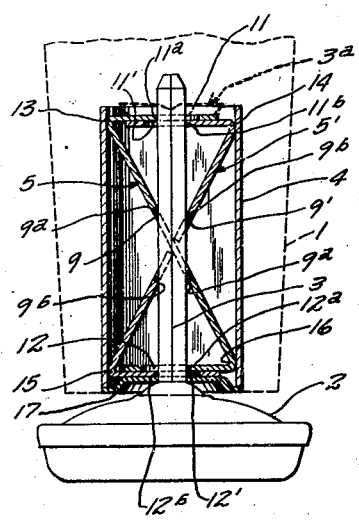
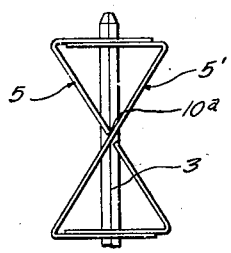
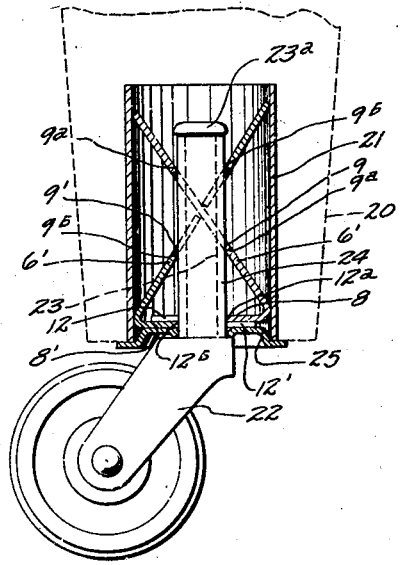
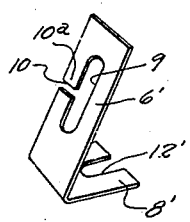
INVENTOR.
George W. Sutton
BY
Bottum, Hudnall, Leake, McKenna and Niedell
ATTORNEYS.

Patented Nov. 5, 1929

1,734,057

UNITED STATES PATENT OFFICE

GEORGE W. SUTTON, OF MENASHA, WISCONSIN

PINTLE RETAINER

Application filed August 20, 1927. Serial No. 214,292.

This invention relates in general to attaching devices for casters, sliding shoes, and the like, and more especially to that type of attaching device known as a pintle bushing.

One object of the invention is to provide a pintle bushing of this character which is designed and adapted to effectively grip and hold the pintle of the caster and also have securing engagement with the wall of the socket in which it is inserted. If the bushing is used in connection with a caster then the bushing grips the sleeve mounted on the stem or pintle of the caster so as to exert its action in this respect without interferring with the capacity of the caster to turn or swivel. When utilized with the so-called sliding shoe then the bushing firmly grips the pintle or stem of the shoe as in such constructions the universal connection is provided between the lower end of the pintle and the shoe proper.

In bushings of this character it is essential to have relatively movable parts which may be engaged with and disengaged from the pintle and which also move relative to each other when the bushing is thrust into the socket. In carrying out the present invention the bushing is made up of a pair of spring retaining members which are crossed and interfitted and have a plurality of pintle engaging members and a plurality of socket engaging portions, the pintle gripping members operating to firmly grasp the pintle under the influence of the socket engaging portions. The several elements of the bushing are so co-ordinated in their action that the operation of one aids and enhances the operation of the other. Along with these advantages, the present invention presents a construction which is simple and durable, reliable and effective in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a fragmentary perspective view showing one form of pintle bushing embodying the present invention, the pintle bushing being shown thrust into a socket;

Figure 2 is a view partly in central vertical section and partly in side elevation illustrating the bushing of Figure 1 when used to retain a sliding shoe operatively associated with the leg of a piece of furniture;

Figure 3 is a view similar to Figure 2 but illustrating a slightly different type of bushing in use in holding a caster associated with a portion or leg of a piece of furniture;

Figure 4 is a detail view in elevation of the bushing employed in Figures 1 and 2 and show how the parts thereof are held in interfitting engagement;

Figure 5 is a detail perspective view of one of the parts of the bushing shown in Figure 3; and Figure 6 is a fragmentary view illustrating one of the central slots of the bushings.

Referring to the drawings and more especially to Figures 1 and 2, the numeral 1 designates generally a portion of an article of furniture which may be a bed post, a leg, or any other appropriate part of an article of furniture which is to be supported. A sliding shoe is designated generally at 2 and has a pintle 3 universally connected thereto and projecting up into the metal socket 4 of the article of furniture 1.

The pintle bushing employed in this form of invention comprises a pair of substantially Z-shaped parts or spring retaining members constructed of strips of spring steel and designated generally at 5 and 5', these parts 5 and 5' being made up of angled, and crossed and interfitted body portions 6 and 6', and overlapping end portions designated at 7 and 7' and at 8 and 8'.

The body portions 6 and 6' have oblong longitudinal slots 9 and 9' at their centers. The slot 9 is intersected by slot 10 which extends from one lateral edge of the body portion 6 into the slot 9. The slot 9' is similarly intersected by slot 10' which extends from the slot 9' out through the opposite lateral edge of the body portion 6'. The end portions 7 and 7' and 8 and 8' have overlapping oblong slots designated at 11 and 11' and 12 and 12'.

In the assembly the Z-shaped retaining members are interfitted, with their body portions 6 and 6' crossing each other, the slots 10 and 10' permitting the complete interfitting of these body portions. When the retaining members are interfitted the ends 7 and 7' and 8 and 8' overlap. With this assembly of the bushing prior to its insertion in the socket 4 the pintle 3 is inserted through the slots 12 and 12', 9 and 9', and 11 and 11'.

The juncture of the end portions and body portions of the spring retaining members present socket engaging edges or portions designated at 13, 14, 15 and 16.

The lower end of the socket 4 is closed in the assembly by a closure plate 17 mounted on the pintle 3 between the bushing and the sliding shoe.

When the bushing is thrust into the socket with the pintle extending through its slots, as described, the socket engaging portions 13, 14, 15 and 16 are displaced inwardly from their normal position by virtue of the engagement of the inner wall of the socket therewith, this inward displacement of these socket engaging portions of the bushing occasioning a flexion and tensioning of the body portions of the bushing whereby to cause these portions 13, 14, 15 and 16 to engage the wall of the socket with sufficient friction to prevent accidental displacement of the bushing and also to cause the spring retaining members of the bushing to securely engage the pintle in the manner which will now be described.

As clearly shown in Figure 2, when the gripping portions 13, 14, 15 and 16 are engaged with the wall of the socket the edges 9$^a$ of the ends of the slot 9 are forced into gripping engagement with the pintle and similarly the edges 9$^b$ of the ends of the slot 9' have gripping engagement with an opposite portion of the pintle. The end portions of the spring retaining members are also displaced inwardly to increase the extent of their overlap and to force end walls 11$^a$ and 11$^b$, and 12$^a$ and 12$^b$ of their slots 11, 11', and 12 and 12' into gripping engagement with the pintle. The pintle thus has three of its portions securely gripped, its upper portion being gripped at two points, its intermediate or central portion at four points and its lower portion at two points whereby the pintle is firmly secured against displacement relative to the bushing under the influence of the very means that secures the bushing in its socket.

This action also results in the releasable locking of the spring retaining members in interfitting engagement for by reason of the flexion of the body portions 6 and 6' about the edges 9$^a$ and 9$^b$ as fulcrums the edges of the upper tongues 10$^a$ defined by the slots 10 and 10' and 9 and 9' are forced against and into gripping engagement with the opposite portions of the strips.

The upper ends of the pintle may be headed or spread as shown in dotted lines at 3$^a$ in Figure 2 to make the sliding shoe, pintle and bushing a unit which will not fall apart when withdrawn from the socket.

In the form of invention shown in Figures 3 and 5 an article of furniture is designated diagrammatically at 20 and has a cylindrical metal socket 21 therein. A caster is designated generally at 22 and has a pintle 23 provided with the usual sleeve 24 retained on the pintle by the head 23$^a$ thereof. A closure plate 25 is provided for the lower end of the socket.

The bushing which is employed for releasably securing the pintle in the socket 21 is similar in all respects to the bushing shown in Figures 1 and 2 except that the upper end portions 7 and 7' are omitted and that the slots 9 and 9' and 12 and 12' are made somewhat larger for the dual purpose of accommodating the larger pintle assembly and facilitating the assembly of the bushing with the pintle of a caster of this kind. Thus, as in the other form of the invention, a pair of spring retaining members are provided and, as before, have the crossed and interfitted body portions 6 and 6' and lower end portions 8 and 8'. The longitudinal and transverse slots 9 and 9' and 10 and 10' are provided at the center and although slightly larger are of exactly the same shape as the similar slots in the other form. The slots 12 and 12' in the lower end portions are sufficiently larger to extend out through the ends of the end portions but these slots 9 and 9' and 12 and 12' have edges or ends 9$^a$ and 9$^b$ and 12$^a$ and 12$^b$ engaging the sleeve of the pintle as in the previous embodiment. Similarily, the spring retaining members present four frictional edges or socket engaging portions. In the assembly the spring retaining members are releasably secured in interfitting relation by the action of the spring tongues 10$^a$ and 10$^b$ just as in the first embodiment. As the bushing grips the sleeve of the pintle, the pintle may freely swivel and yet it may not be displaced axially.

It is to be understood that while a caster is shown with the form of the invention shown in Figure 3, the sliding shoe may be employed, and likewise while the sliding shoe is shown in connection with the bushing illustrated in Figures 1 and 2, a caster may replace this sliding shoe.

The invention claimed is:

1. A pintle retainer for casters, shoes or the like comprising a pair of crossed and interfitted spring retaining members having means gripping the pintle and having portions adapted for securing engagement with the walls of a socket or the like, said spring retaining members being held interfitted and in gripping engagement with the pintle and with the socket by virtue of the mutual action of the pintle, the spring retaining members and the socket.

2. A pintle retainer for casters, shoes, and the like, comprising a pair of retaining members having crossed intermediate portions slotted to interfit with each other and apertured to receive the pintle and having end portions adapted to grip the walls of a socket, the walls of the apertures being adapted to grip the pintle.

3. A pintle retaining member for casters, shoes, and the like, comprising a pair of retaining members having crossed intermediate portions slotted to interfit with each other and apertured to receive the pintle, said spring retaining members also having overlapping end portions apertured to receive and grip the pintle, the junctures of the end portions and intermediate portions being adapted to grip the wall of the socket.

4. A pintle retainer for casters, shoes and the like, comprising a pair of substantially Z-shaped spring retaining members having crossed body portions slotted to interfit with each other and apertured to receive and grip the pintle, said spring retaining members also having overlapping end portions apertured to receive and grip the pintle, said spring retaining members also having portions adapted to frictionally engage the socket, said portions being displaced when frictionally engaged with the socket to tension the spring retaining members and enhance their gripping engagement with the pintle.

5. A pintle retainer for casters, shoes, and the like, comprising a pair of substantially Z-shaped spring retaining members having crossed body portions slotted to interfit with each other and apertured to receive and grip the pintle, said spring retaining members also having overlapping end portions apertured to receive and grip the pintle, said spring retaining members also having portions adapted to frictionally engage the socket, said portions being displaced when frictionally engaged with the socket to tension the spring retaining members and enhance their gripping engagement with the pintle, said spring retaining members having spring tongues, the spring tongue of one member engaging the opposite portion of the other to releasably secure the members interfitted when the bushing is inserted in the socket.

6. A pintle retainer for casters, shoes, and the like, comprising a pair of substantially Z-shaped spring retaining members having crossed and interfitted body portions and overlapping end portions, said spring retaining members being apertured to receive and grip three spaced portions of the pintle at a plurality of points.

7. A pintle retainer for casters, shoes, and the like, comprising a pair of spring retaining members having crossed and interfitted body portions and overlapping end portions, said spring retaining members being apertured to receive and grip the central portion and an end portion of the pintle at a plurality of spaced points.

In witness whereof, I hereto affix my signature.

GEORGE W. SUTTON.